United States Patent
Chen et al.

(10) Patent No.: US 12,105,243 B2
(45) Date of Patent: *Oct. 1, 2024

(54) METHOD AND APPARATUS FOR FLOW LINE PARAMETER INTERPRETATION WITH DIVERSE FLOW MODELS

(71) Applicant: Halliburton Energy Services, Inc., Houston, TX (US)

(72) Inventors: Dingding Chen, Plano, TX (US); Mark A. Proett, Missouri City, TX (US); Li Gao, Katy, TX (US); Christopher Michael Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 325 days.

This patent is subject to a terminal disclaimer.

(21) Appl. No.: 17/723,920

(22) Filed: Apr. 19, 2022

(65) Prior Publication Data

US 2022/0252759 A1 Aug. 11, 2022

Related U.S. Application Data

(63) Continuation of application No. 17/480,986, filed on Sep. 21, 2021, now Pat. No. 11,994,644, which is a (Continued)

(51) Int. Cl.
*G01V 20/00* (2024.01)
*E21B 49/08* (2006.01)
(Continued)

(52) U.S. Cl.
CPC ............ *G01V 20/00* (2024.01); *E21B 49/087* (2013.01); *G06N 3/126* (2013.01); *G06N 20/00* (2019.01)

(58) Field of Classification Search
USPC .......................................................... 702/2
See application file for complete search history.

(56) References Cited

U.S. PATENT DOCUMENTS

| | | | |
|---|---|---|---|
| 7,036,579 B2 * | 5/2006 | Follini | E21B 49/00 166/264 |
| 7,059,179 B2 | 6/2006 | Proett et al. | |
| 2003/0094040 A1 | 5/2003 | Proett et al. | |
| 2005/0119911 A1 | 6/2005 | Ayan et al. | |

(Continued)

OTHER PUBLICATIONS

Kennedy M., O'Hagan A.: "Bayesian Calibration of Computer Models", J.R. Statist. Soc. Ser. B. Stat. Methodol. 68, 425-464.

(Continued)

*Primary Examiner* — Paul D Lee
(74) *Attorney, Agent, or Firm* — John Wustenberg; C. Tumey Law Group PLLC

(57) ABSTRACT

Improved systematic inversion methodology applied to formation testing data interpretation with spherical, radial and/or cylindrical flow models is disclosed. A method of determining a flow line parameter includes determining a diverse set of flow models and selecting at least one flow model from the diverse set of flow models representative, at least in part, of a formation tester tool, at least one formation, at least one fluid, and at least one flow of the at least one fluid. The method further includes lowering the formation testing tool into the at least one formation to intersect with the formation at least one formation and sealing a probe of the formation tester placed in fluid communication with the at least one formation. The method further includes initiating flow from the at least one formation and utilizing the at least one selected flow model to predict the flow line parameter.

20 Claims, 4 Drawing Sheets

Related U.S. Application Data continuation of application No. 14/404,328, filed as application No. PCT/US2012/043457 on Jun. 21, 2012, now Pat. No. 11,156,741.

(51) Int. Cl.
*G06N 3/126* (2023.01)
*G06N 20/00* (2019.01)

(56) References Cited

U.S. PATENT DOCUMENTS

| | | | |
|---|---|---|---|
| 2005/0270903 A1 | 12/2005 | Ramakrishnan | |
| 2006/0241867 A1 | 10/2006 | Kuchuk et al. | |
| 2007/0010956 A1 | 1/2007 | Nerguizian | |
| 2007/0119244 A1 | 5/2007 | Goodwin | |
| 2007/0215556 A1 | 9/2007 | Kim | |
| 2008/0126048 A1 | 5/2008 | Labourdette | |
| 2008/0162100 A1* | 7/2008 | Landa | E21B 43/00 703/10 |
| 2008/0210470 A1 | 9/2008 | Stewart | |
| 2009/0043555 A1 | 2/2009 | Busby et al. | |
| 2009/0192768 A1 | 7/2009 | Zuo | |
| 2009/0204328 A1* | 8/2009 | Stewart | G01V 9/00 702/12 |
| 2010/0076740 A1 | 3/2010 | Kuchuk et al. | |
| 2012/0239363 A1* | 9/2012 | Durrani | E21B 43/00 703/10 |
| 2015/0039234 A1 | 2/2015 | Abou-Sayed | |

OTHER PUBLICATIONS

Sung, Andrew H., "Application of soft computing in petroleum engineering", SPE vol. 3812, Part of the SPE Conference on Applications and Science of Neural Networks, Fuzzy Systems, and Evolutionary Computation II, Denver, Colorado.

Proett, M. and Chin, D., "New exact spherical flow solution with storage and skin for early-time interpretation with applications to wireline formation and early-evaluation drill stem testing", SPE 49140.

Vega L., Rojas, D. and Datta-Gupta, A., "Scalability of the deterministic and Bayesian approaches to production-data integration into reservoir models", SPE 88961.

SPWLA 51, Synthetic and field examples of the Bayesian stochastic inversion of Gamma-ray, density, and resistivity logs.

International Search Report and Written Opinion issued in related PCT Application No. PCT/US2012/043457 mailed Feb. 22, 2013, 12 pages.

Kuchuk et al., "Determination of In Situ Two-Phase Flow Properties Through Downhole Fluid Movement Monitoring", SPE116068, SPE Reservoir Evaluation & Engineering, vol. 13, No. 4, Aug. 1, 2010.

Cheng et al., "A Structured Approach for Probabilistic-Assisted History Matching Using Evolutionary Algorithms," Tengiz Field Applications, Sep. 21-24, 2008, Society of Petroleum Engineers, SPE 116212, pp. 1-18.

\* cited by examiner

METHOD AND APPARATUS FOR FLOW LINE PARAMETER INTERPRETATION WITH DIVERSE FLOW MODELS

CROSS-REFERENCED TO RELATED APPLICATIONS

The present application is a Continuation of U.S. patent application Ser. No. 17/480,986 filed Sep. 21, 2021, which is a Continuation of U.S. patent application Ser. No. 14/404,328 filed Nov. 26, 2014, which is a U.S. National Stage Application of International Application No. PCT/US2012/043457 filed Jun. 21, 2012, which are incorporated herein by reference in their entirety for all purposes.

BACKGROUND

Hydrocarbons, such as oil and gas, are commonly obtained from subterranean formations. The development of subterranean operations and the processes involved in removing hydrocarbons from a subterranean formation are complex. Typically, subterranean operations involve a number of different steps such as, for example, drilling the wellbore at a desired well site, treating the wellbore to optimize production of hydrocarbons, and performing the necessary steps to produce and process the hydrocarbons from the subterranean formation.

In order to optimize the performance of subterranean operations, it is often beneficial to determine various formation characteristics such as, for example, pressure and/or permeability. A formation tester may be utilized to determine formation characteristics. The formation tester is typically lowered into a borehole traversing a formation of interest. A probe of the formation tester may then be extended and sealingly placed in fluid communication with the formation of interest. Formation fluid may then be drawn by the formation tester, and the transient pressure response of the formation may be monitored. FIG. 1 depicts a typical transient pressure response obtained by plotting the data acquired from a single probe of a formation tester. A first segment 102 of the transient pressure response shows the pressure drawdown. This is the differential pressure that drives fluids from the formation into the wellbore. A second segment 104 of the transient pressure response represents the pressure buildup which is an indication of a rise in pressure as a function of time observed after a well is shut in or after the production rate is reduced. Finally, a third segment 106 of the transient pressure response represents the stabilized pressure. The obtained transient pressure response may then be analyzed to determine various characteristics of the formation of interest.

There is an increasing need to improve formation tester data analysis by enhancing field data interpretation and expanding the formation evaluation regression parameters. Typically, only well-established analytical drawdown and traditional buildup techniques are utilized using linear regression methods. Newer transient models have not been used, in part, due to the higher level of expertise needed to do the analysis and slower speed of enhanced regression methods. However, it is desirable to develop more efficient regression or inversion algorithms to handle driven flow equations that may be embedded with skin, flowline storage, formation storage, and anisotropic effects that make determination of any heuristic non-iterated solutions difficult.

Figure 1:
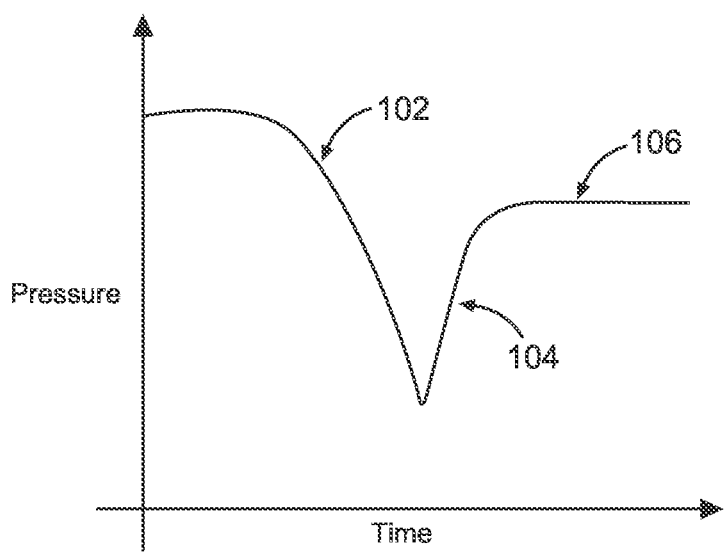
FIG. 1 is a typical transient pressure response obtained by plotting the data acquired from a single probe of a formation tester.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline, MWD and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present application is directed to improved systematic inversion methodology applied to formation testing data interpretation with spherical, radial and/or cylindrical flow models. With the disclosed methodology, faster inversion algorithms may be developed based on deterministic, probabilistic and evolutionary principles. In certain embodiments, the methods disclosed herein may be utilized to build multiple simulators which can be implemented into hybrid or integrated information handling system instructions for data analysis, results comparison and decision making. Accordingly, the inversion methods applied to formation testing data interpretation with analytical flow models may be implemented deterministically, probabilistically and/or evolutionarily as discussed in more detail below using a spherical flow model as examples. Essentially, a first parameter of the formation (e.g., pressure) may be measured.

Regression methods (as discussed in more detail below) may then use the measured parameter to obtain the value of other formation parameters of interest (e.g., fluid mobility and skin factor) based on the relationship between the first parameter and the other parameters of the formation.

The deterministic approach utilizes the Levenberg-Marquardt ("LM") algorithm which provides a numerical solution to the problem of minimizing a function (generally a nonlinear one) over a space of parameters of the function. In accordance with an embodiment of the present disclosure, Gauss-Newton approximation of a Hessian matrix may be applied to formation testing data in determining multiple reservoir and flow line parameters with selected flow models. The regression algorithm developed is conceptually analogous to a training algorithm using field measurements (such as those shown in FIG. 1) as targets, with the objective to optimize the spherical flow equation parameters so that the curve mismatch between the field measurements and a simulated buildup response is minimized. The parameter update is implemented with the LM algorithm which is a variation of Gauss-Newton approximation and requires calculation of the partial derivatives of error function with respect to various parameters associated with flow equations, such as, for example, initial formation pressure and porosity, fluid mobility and compressibility, and flow line volume and borehole skin factor. Equations (1)-(3) below present a summary of the LM algorithm, where $F_t(w_k)$ is the error function, $J(w_k)$ is the Jacobian matrix and $H(w_k)$ is the Hessian matrix implemented with Gauss-Newton approximation.

$$F(w_k) = e^T(w_k)e(w_k) \tag{1}$$

$$w_{k+1} = w_k - H^{-1}(w_k)\nabla F(w_k) \tag{2}$$

$$H(w_k) = \nabla^2 F(w_k) \approx J^T(w_k)J(w_k) + I_N \mu_w \tag{3}$$

A tunable parameter $\mu_w$ is used in Eq. (3) which makes parameter update equation set forth in Eq. (2) equivalent to a gradient based approach when a large value of $\mu_w$ is selected, and a Newton based approach if the $\mu_w$ value is small. $I_N$ is an identity Matrix with N being the independent number of reservoir parameters included in the analytical flow models.

Eq. (4) below provides an example of a Jacobian matrix or sensitivity matrix with a spherical flow model, which is the partial derivative of misfit between measured and calculated pressures with respect to an initial reservoir pressure $p_i$, fluid mobility mob, skin factor s, formation porosity $\varphi$, fluid compressibility $C_f$, mud compressibility $C_m$, and flow line volume $F_{vol}$.

$$J(w) = \begin{bmatrix} \frac{\partial e_1}{\partial p_i} & \frac{\partial e_1}{\partial mob} & \frac{\partial e_1}{\partial s} & \frac{\partial e_1}{\partial \phi} & \frac{\partial e_1}{\partial C_f} & \frac{\partial e_1}{\partial C_m} & \frac{\partial e_1}{\partial F_{vol}} \\ \frac{\partial e_2}{\partial p_i} & \frac{\partial e_2}{\partial mob} & \frac{\partial e_2}{\partial s} & \frac{\partial e_2}{\partial \phi} & \frac{\partial e_2}{\partial C_f} & \frac{\partial e_2}{\partial C_m} & \frac{\partial e_2}{\partial F_{vol}} \\ \cdots \\ \frac{\partial e_n}{\partial p_i} & \frac{\partial e_n}{\partial mob} & \frac{\partial e_n}{\partial s} & \frac{\partial e_n}{\partial \phi} & \frac{\partial e_n}{\partial C_f} & \frac{\partial e_n}{\partial C_m} & \frac{\partial e_n}{\partial F_{vol}} \end{bmatrix} \tag{4}$$

In one embodiment, some of the flow line parameters such as $C_f$, $C_m$, and $F_{vol}$ may be estimated in a pre-processing step. These parameters may then be removed from the list of variables to be determined in order to simplify the sensitivity matrix. If the misfit between measured and calculated pressures is evaluated from the pressure buildup curve, the system response of buildup pressure may be determined using the following equation:

$$P_{bu} = P_{dd} + P_s \times P_{dsbu}(t_{bu}, mob, s, \phi, C_f, C_m, F_{vol}), \quad (5)$$

where $P_{dsbu}$ is the dimensionless wellbore source pressure of buildup calculated from flow models; $P_{dd}$ is the drawdown pressure; and $P_s$ is a pressure converting factor to convert dimensionless pressure to actual pressure in pounds per square inch ("psi"). In one embodiment, formation tester of a straddle packer may be used and $P_s$ may be evaluated using the following equation:

$$P_s = \frac{14696 Q_0}{4\pi R_s mob}, \quad (6)$$

where $Q_0$ is the drawdown flow rate (in cc/sec) and $R_s$ is the equivalent source radius.

Moreover, the drawdown pressure ($P_{dd}$) may be determined as:

$$P_{dd} = P_i - P_s \times P_{dsdd}(t_{dd}, mob, s, \phi, C_f, C_m, F_{vol}), \quad (7)$$

where $P_{dsdd}$ is the dimensionless wellbore source pressure of drawdown calculated from flow models, and $P_i$ is the initial reservoir pressure. If D is the measurement data of buildup curve, then the misfit or error ("e") at each point may be written as:

$$e = D - P_{bu} = D - P_i - P_s \times (P_{dsbu} - P_{dsdd}). \quad (8)$$

For spherical flow, the transient wellbore dimensionless source pressure can be formulated directly from an inverse Laplace transform of the solution obtained in the Laplace domain using the following equation:

$$P_{ds} = -\frac{1+S}{SC_d} \sum_{n=1}^{3} \left\{ \frac{1}{y_n} \left[ 1 - \left(1 + \frac{x_n S}{1+S}\right) e^{x_n^2 t_d} \text{erfc}\left(-x_n \sqrt{t_d}\right) \right] \right\} \quad (9)$$

Note that $P_{dsdd}$ and $P_{dsbu}$ are special cases of $P_{ds}$ with dimensionless time $t_d$ calculated from drawdown duration $t_{dc}$ and buildup duration $t_{bu}$, respectively. S in Eq. (9) represents skin factor. In Eq. (9), $C_d$ is the flow line storage factor which may be determined as:

$$C_d = \frac{F_{vol} C_m}{4.0 \pi R_s^3 \phi C_f}. \quad (10)$$

Further, in Eq. (9), $x_n$ (n=1, 2, 3) is the root of cubic equation:

$$x^3 + \left(\frac{1+S}{S}\right) x^2 + \frac{x}{SC_d} + \frac{1}{SC_d} = 0 \quad (11)$$

where $x_1$ is a real number and $x_2$ $x_3$ are a conjugate pair of complex numbers. Additionally, in Eq. (9), $y_n$ (n=1, 2, 3) is a function of roots above and may be obtained as follows:

$$y_1 = x_1(x_1 - x_2)(x_1 - x_3) \quad (12)$$
$$y_2 = x_2(x_2 - x_1)(x_2 - x_3) \quad (13)$$
$$y_3 = x_3(x_3 - x_1)(x_3 - x_2) \quad (14)$$

The dimensionless time $t_d$ in Eq. (9) is also a function of activity duration (drawdown duration or buildup duration), fluid mobility mob, formation porosity $\phi$, fluid compressibility $C_f$, and equivalent source radius $R_s$, where:

$$t_d = \frac{t \times mob}{14696 \phi C_f R_s^2}. \quad (15)$$

Note that Eq. (9) includes calculation of $$e^{x_n^2 t_d} \text{erfc}\left(-x_n \sqrt{t_d}\right),$$

i.e., the product of two terms equals $e^{z^2} \text{erfc}(z)$ in general. Directly computing each term above often leads to numerical problems in large-time solution. If z is a large real number, taking the first few terms of the following equation is sufficiently accurate:

$$e^{z^2} \text{erfc}(z) = \frac{1}{z\sqrt{\pi}} \sum_{0}^{\infty} (-1)^n \frac{(2n)!}{n!(2z)^{2n}} \quad (16)$$

For complex number z, the error function is defined as:

$$\text{erfc}(z) = \frac{2}{\sqrt{\pi}} \int_{z}^{\infty} e^{-t^2} dt \quad (17)$$

Solving the complex error function may entail using Faddeeva function defined below where i=sqrt (−1):

$$w(z) = e^{-z^2} \text{erfc}(-iz) \quad (18)$$

Note that w(z) is not the solution. The value of erfc(z) can be calculated by elementary relations:

$$w(iz) = e^{-(iz)^2} \text{erfc}(z) \quad (19)$$
$$\text{erfc}(z) = e^{-z^2} w(iz) \quad (20)$$

The product $e^{z^2}\text{erfc}(z)$ then can be calculated from the Faddeeva function directly.

$$e^{z^2}\text{erfc}(z) = w(iz) \quad (21)$$

With all terms in Eq. (9) clearly defined above, calculation of partial derivative of curve misfit Eq. (8) with respect to each reservoir parameter of interest may be obtained using the chain rule. For example, calculating partial derivative $\partial P_{ds}/\partial\text{mob}$ includes calculation of $$\partial\left(e^{x_n^2 t_d}\text{erfc}\left(-x_n\sqrt{t_d}\right)\right)/\partial t_d.$$

Using me chain rule, $$\partial\left(e^{x_n^2 t_d}\text{erfc}\left(-x_n\sqrt{t_d}\right)\right)/\partial t_d = \quad (22)$$

$$\frac{\partial\left(e^{x_n^2 t_d}\right)}{\partial t_d}\text{erfc}\left(-x_n\sqrt{t_d}\right) + \frac{\partial\text{erfc}\left(-x_n\sqrt{t_d}\right)}{\partial t_d}e^{x_n^2 t_d}$$

$$\frac{\partial\left(e^{x_n^2 t_d}\right)}{\partial t_d}\text{erfc}\left(-x_n\sqrt{t_d}\right) = e^{x_n^2 t_d}x_n^2\text{erfc}\left(-x_n\sqrt{t_d}\right) \quad (23)$$

$$\frac{\partial\text{erfc}\left(-x_n\sqrt{t_d}\right)}{\partial t_d}e^{x_n^2 t_d} = \frac{x_n}{\sqrt{\pi t_d}} \quad (24)$$

In instances where $x_n=x_1$ (root of real number) and $-x_1\sqrt{t_d}$ is not too large, the product in Eq. (23) can be calculated term by term, and Eq. (22) becomes:

$$\partial\left(e^{x_1^2 t_d}\text{erfc}\left(-x_1\sqrt{t_d}\right)\right)/\partial t_d = e^{x_1^2 t_d}x_1^2\text{erfc}\left(-x_1\sqrt{t_d}\right) + \frac{x_1}{\sqrt{\pi t_d}} \quad (25)$$

For large-time solution, Matlab® function erfcx( ) can be used to calculate scaled $$e^{x_1^2 t_d}\text{erfc}\left(-x_1\sqrt{t_d}\right)$$

as shown in Eq. (26) below $$\partial\left(e^{x_1^2 t_d}\text{erfc}\left(-x_1\sqrt{t_d}\right)\right)/\partial t_d = x_1^2\text{erfcx}\left(-x_1\sqrt{t_d}\right) + \frac{x_1}{\sqrt{\pi t_d}} \quad (26)$$

In instances where $x_n=x_2$ and $x_n=x_3$ (roots of complex conjugate pair), Faddeeva algorithm is used to find solution of Eq. (21), and Eq. (22) becomes:

$$\partial\left(e^{x_2^2 t_d}\text{erfc}\left(-x_2\sqrt{t_d}\right)\right)/\partial t_d = x_2^2 faddeeva(sqrt(-1)(-x_2\sqrt{t_d})) + \frac{x_2}{\sqrt{\pi t_d}} \quad (27)$$

After Eq. (27) is computed, the same partial derivative for the conjugate root $x_n=x_3$ can be expressed as $$\partial\left(e^{x_3^2 t_d}\text{erfc}\left(-x_3\sqrt{t_d}\right)\right)/\partial t_d = conj\left(\partial\left(e^{x_2^2 t_d}\text{erfc}\left(-x_2\sqrt{t_d}\right)\right)/\partial t_d\right) \quad (28)$$

Although the example above only shows how to calculate $$\partial\left(e^{x_n^2 t_d}\text{erfc}\left(-x_n\sqrt{t_d}\right)\right)/\partial t_d,$$

which is part of calculating $\partial P_{ds}/\partial\text{mob}$, same principals are applied in computing other terms, especially in dealing with a complex complementary error function. For each data point under consideration, the partial derivatives with respect to each reservoir parameter can be calculated in the same manner to construct the Jacobian matrix as shown in Eq. (4). The update of reservoir parameters can then be implemented using Gauss-Newton approximation to obtain the Hessian matrix of Eq. (3).

The advantage of using Gauss-Newton approximation as compared to Hessian matrix is that the Gauss-Newton approximation does not compute second derivatives, making it more efficient. The methods disclosed herein have been demonstrated in several scenarios for conventional drawdown and buildup curve matching with different probe types and straddle packers. The results are demonstrated using synthetic data in FIGS. 2-4 (discussed in more detail below) and show a significant improvement over traditional methods by expanding the inversion parameters. Variation of output formation parameters with LM algorithm is also smaller than its counterparts. Generally, the parameter refinement may be completed quickly with LM based optimization if reservoir and flow line parameters are well estimated during input initialization.

Figure 2:
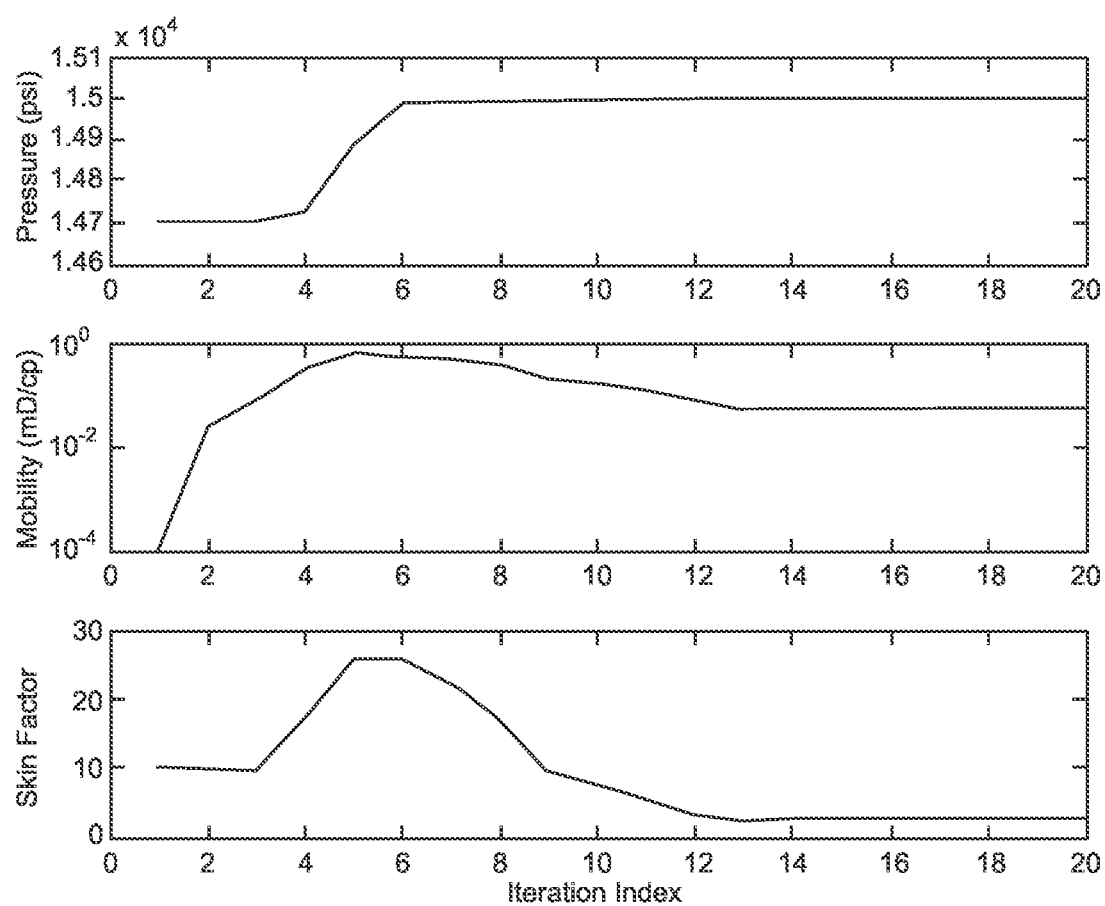
FIG. 2 shows trajectories of reservoir and borehole parameters during inversion applied to straddle packer simulation data.

FIG. 2 depicts trajectories of parameter change for an iterative inversion example applied to straddle packer simulation data using a LM algorithm in accordance with an embodiment of the present disclosure. In this case, the actual reservoir pressure, fluid mobility and wellbore skin factor are 15000 psi, 0.05 millidarcy/centipoise (mD/cp) and 2.00, respectively. The inversion process was initiated with an initial guessed value for each of these parameters. Specifically, the initial guessed values for actual reservoir pressure, fluid mobility and bore skin factor were 14700 psi, 0.0001 mD/cp and 10.00, respectively. As shown in FIG. 2, using the methods disclosed herein provided convergence to the correct values of all three of these reservoir parameters after only 15 iterations.

Figure 3:
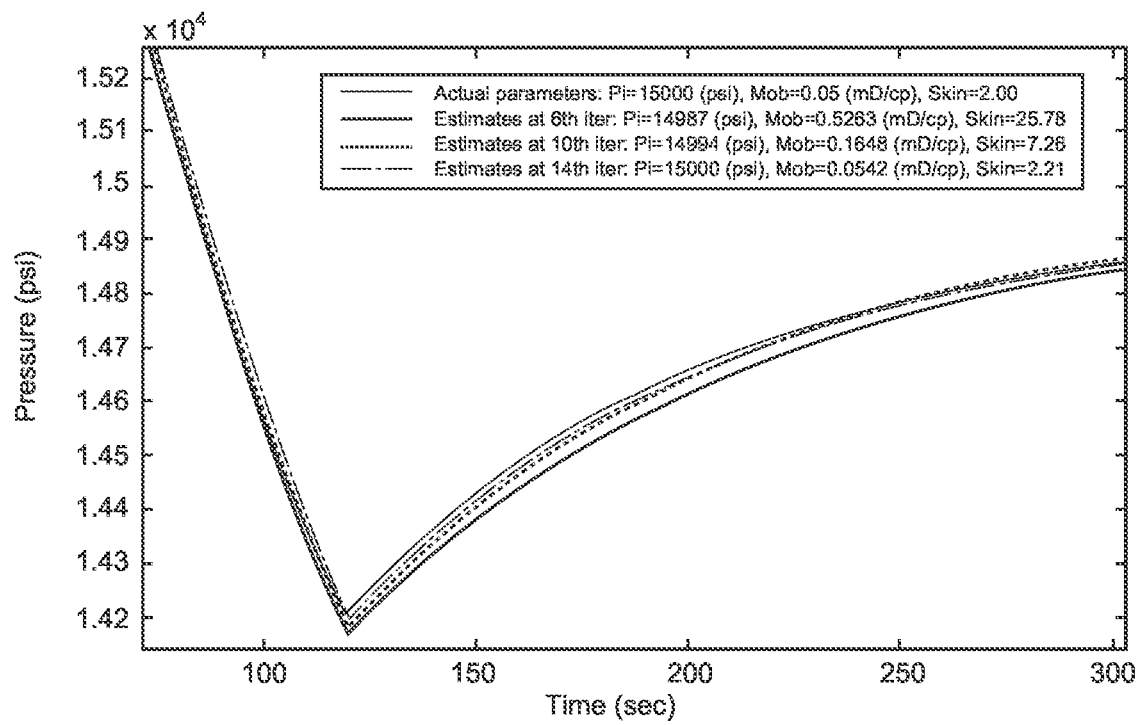
FIG. 3 shows an estimation of parameters through curve matching after 6th, 10th and 14th iterations with Levenberg-Marquardt algorithm.
Figure 4:
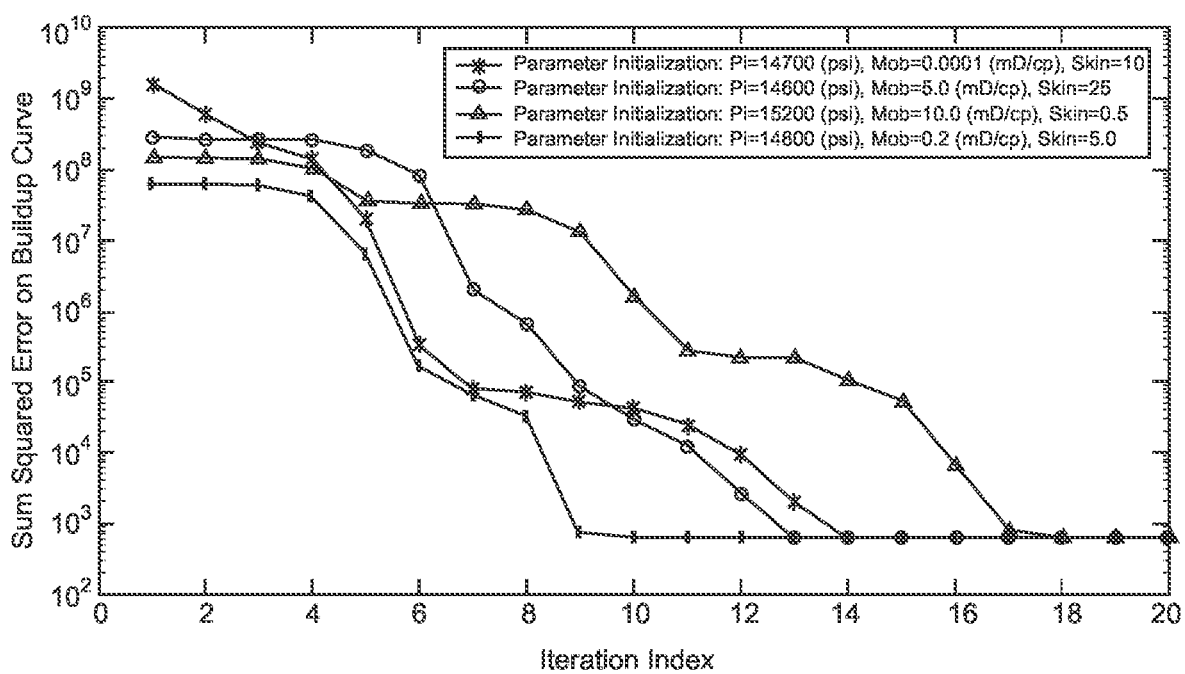
FIG. 4 shows trajectories of buildup curve misfit as a function of parameter initialization and iteration number.

FIG. 3 represents the results of a curve match using the same example used in FIG. 2 after the 6th, 10th and 14th iterations. Initiated from the same conditions, the curve misfit is reduced as the number of iterations increases. As shown in FIG. 3, the curve after the 14th iteration almost overlaps the curve of actual measurements. Moreover, the resulting model parameters are within the tolerance of the restricted step of LM algorithm, which is adequately accurate for real applications. FIG. 4 depicts trajectories of the error function for the same example, with the reservoir parameters initialized at different values. The robustness of the disclosed algorithm is demonstrated by this test. Specifically, FIG. 4 demonstrates that the global minimum of the error function may be reached in 10 or 20 iterations from diverse initializations and that the output parameters of final inversion converged to the same actual values as shown in FIG. 3.

In certain embodiments, a probabilistic approach using Bayesian learning algorithm may be applied to formation testing data to determine desired formation characteristics. Unlike the deterministic approach discussed above which requires parameter initialization, the Bayesian methods entails iteratively updating the posterior probability in model parameter space through maximizing the evidence observed in the data based on so called "prior knowledge" or "probability" of the same object. In accordance with an embodiment of the present disclosure, a Gaussian-Newton approach and the computational scheme for maximizing a posterior parameter estimate may be expressed as:

$$\Delta w_{k+1} = -(J^T(w_k)J(w_k) + I_N(\mu_w + \alpha))^{-1}(J^T(w_k)e(w_k) + \alpha(w_k - w_p)) \quad (29)$$

where $w_p$ is the prior knowledge of reservoir parameters; $w_k$ is the vector of reservoir parameters at iteration k; $\alpha$ is the coefficient to penalize the difference between prior parameters and the actual parameters used; J is the same Jacobian matrix as shown in Eq. (4) and $J^T$ is the transpose of J. The parameter vector for the next iteration may then be determined as:

$$w_{k+1} = w_k + \Delta w_{k+1} \quad (30)$$

The scalar coefficient $\mu_w$ may be determined by using restricted step method to minimize the weighted performance function of Eq. (31) (also called regularized performance function) to ensure that improved performance is achieved with use of updated parameters.

$$F(w_k) = e^T(w_k)e(w_k) + \alpha(w_k - w_p)^T(w_k - w_p) \quad (31)$$

Figure 5:
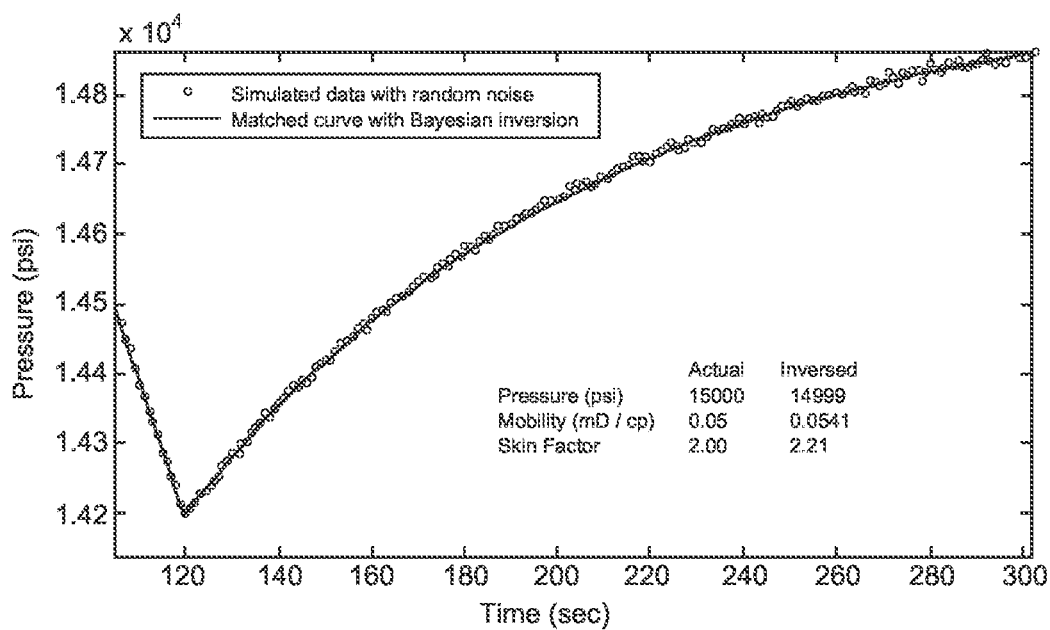
FIG. 5 shows inversion from noise data with Bayesian method.
Figure 6:
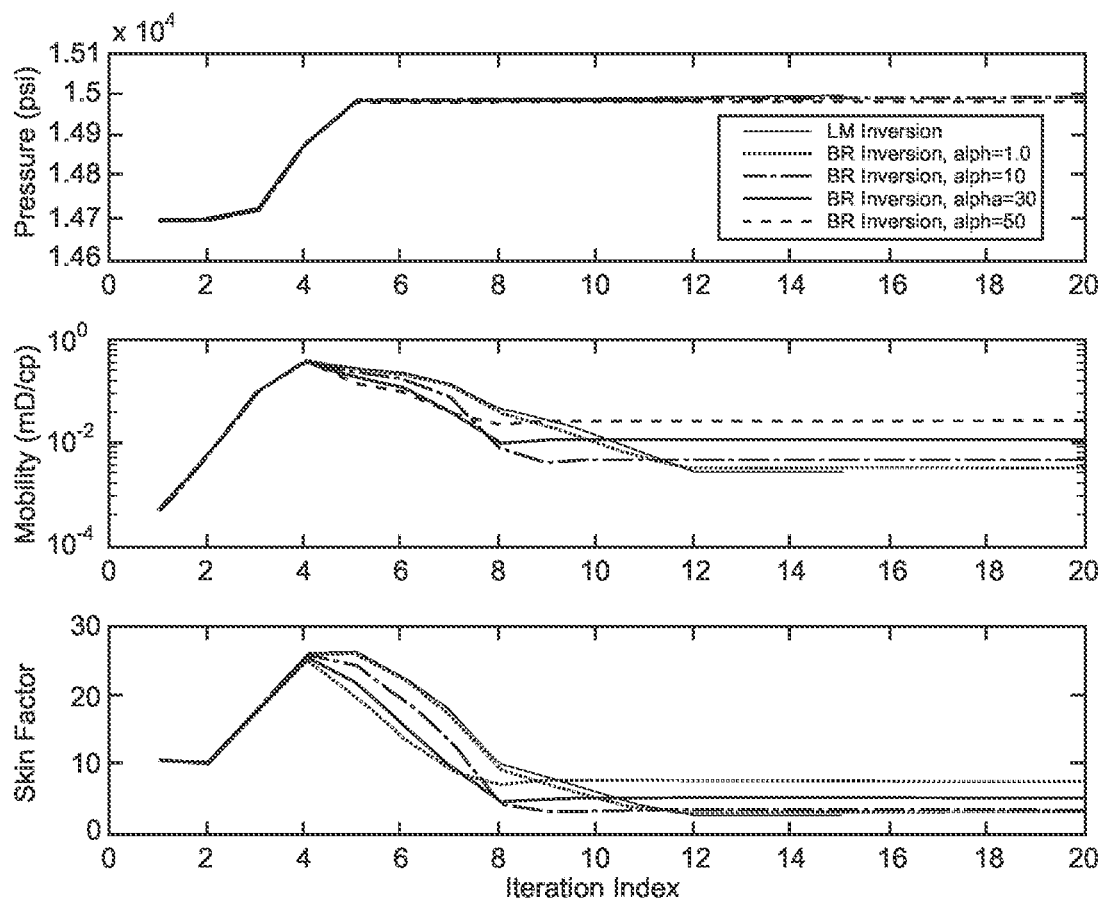
FIG. 6 shows parameter trajectories as a function of regularization parameter with Bayesian inversion applied to noise data.

Using a small value of $\alpha$ will encourage the difference between initial reservoir parameters, $w_i$, and $w_p$, making results with Bayesian regularization similar to the results inversed with LM algorithm. In contrast, selecting a large $\alpha$ would closely relate inversed parameters to prior knowledge on reservoir parameters. This concept is demonstrated in FIGS. 5 and 6, where data deployed in FIG. 2 are re-used with corrupted random noise (zero mean, standard deviation of 5.0) and inversed with Bayesian regularization algorithm. The initial reservoir parameters $w_i$ are set to same for this experiment, and one additional parameter vector $w_p$ is used with Bayesian regularization (BR). It can be observed from FIG. 5 that accurate inversion is achieved with a value of 0.01. In FIG. 5, both LM and BR inversions are converged to almost same parameters when a is small (<1.0 in this example). However, for large $\alpha$ values, near prior parameters are obtained. The prior parameters $w_p$ in this example are 14800 psi for pressure, 0.2 mD/cp for mobility and 5.0 for skin factor. Although the resulting mobility and skin factor are a balanced solution of prior parameters and noisy measurement data with use of larger value of $\alpha$, the resulting formation pressures in these cases are still good estimates of actual pressures, which contribute significantly to the performance function and will lead to acceptable overall parameter estimates. With limited knowledge of reservoir parameters, it is safe to use small or medium a to make robust inversion based on the methods disclosed herein.

To further reduce the computational time, an alternative embodiment is provided in which an approximate Jacobian is used during each iteration. Let $B_k$ be the approximate Jacobian matrix at the k-th iteration, then the Jacobian matrix for the k+1-th iteration can be obtained using rank-one quasi-Newton update (see, for example, C. G. Broyden, Math. Comp., 19, p. 577-593, 1965) as:

$$B_{k+1} = B_k + [\Delta y_k - B_k w_k]\frac{w_k^T}{w_k^T w_k} \quad (32)$$

where $\Delta y_k$ is the change in predicted response at iteration k.

In certain embodiments, an evolutionary method using faster genetic algorithm may be applied to formation testing data to determine desired formation characteristics. Evolutionary computation is suitable for solving optimization problems when calculation of derivatives is not desirable due to complexity of physical systems and underlying response functions. Given the searching range in parameter space, the typical application of evolutionary computation is evolving high-dimension parameters through multiple generations and using genetic operators such as selection, mutation and crossover to find the best parameter combinations that minimize the misfit function. Although eliminating the need for calculating derivatives simplifies the computation for genetic algorithm, an adequately large population size and generation number are usually required (that may be computation expensive) to ensure that enough candidates are available at initialization and global optimum can be reached after iterations.

In accordance with an embodiment of the present disclosure, the evolutionary method is performed by using a large time step in order to reduce the data size. In one embodiment, the time step may be approximately a 1.0 second interval. A log scale is then utilized for chromosome design to enhance linearity over the parameter range. A chromosome is usually a binary string to represent each parameter in a genetic algorithm. The specification in chromosome design includes the number of bits to be used, upper and lower boundary of parameter, and if any transformation is needed to change the scale. The mobility for the range of 0.0001 to 10000 mD/cp in actual unit, for example, can be re-scaled to −4 to 4 with log 10 transformation. This may help improve the numerical resolution when the dynamic range of parameter in actual unit is too large. The search boundaries of parameters are then narrowed when their variations can be inferred from measurements and prior knowledge. Optimization over a narrow parameter range requires only a small number of generation to converge. It is often the case that the uncertainty of each reservoir parameter is different. Therefore a narrow dynamic range or constant may be set for the parameters with low uncertainty to concentrate optimization effort over highly uncertain parameters. Accordingly, the total computational cost of the Genetic Algorithm ("GA") becomes similar to that used with LM and BR algorithms by optimizing selection of population size and generation number.

Figure 7:
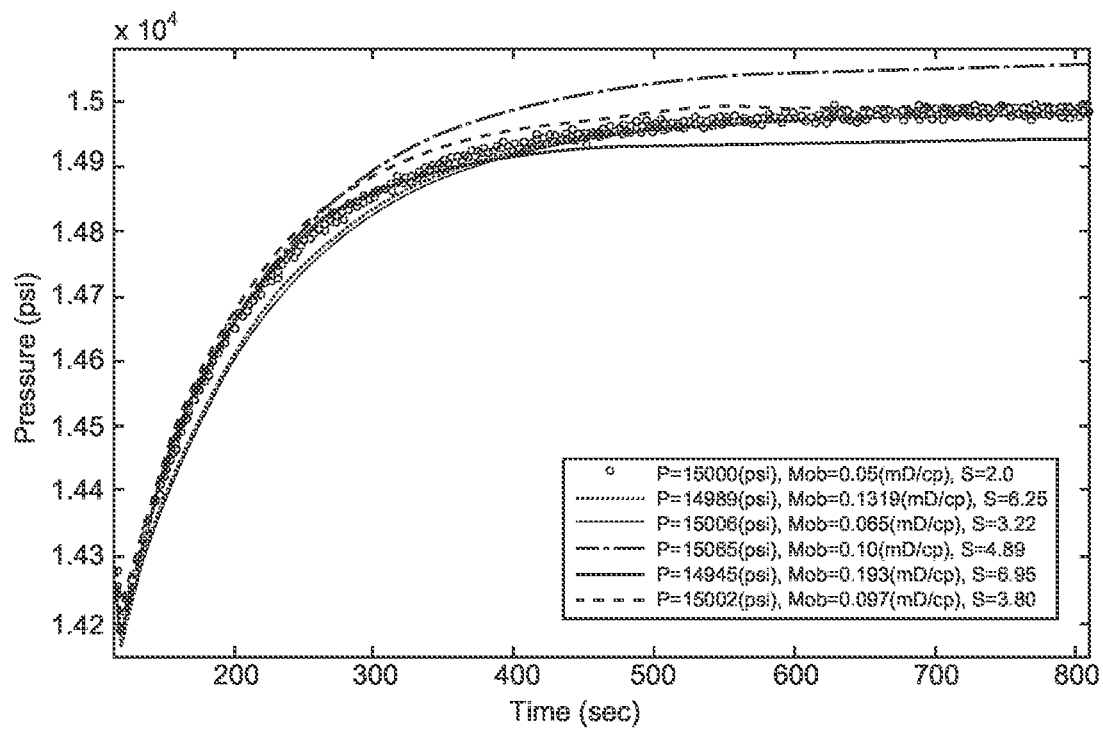
FIG. 7 shows curve matching using a faster Genetic Algorithm inversion routine with a wide parameter searching range.
Figure 8:
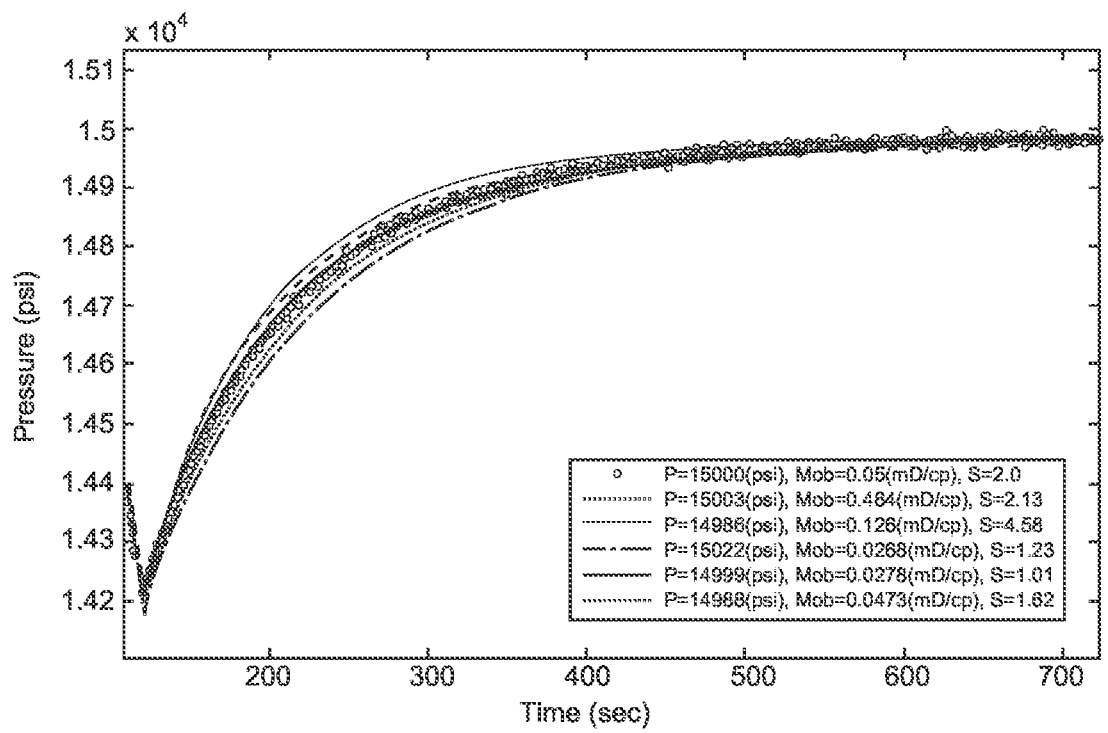
FIG. 8 shows curve matching using a faster Genetic Algorithm inversion routine with a narrow pressure searching range.

FIG. 7 depicts an exemplary curve matching using a faster GA inversion routine with a wide parameter searching range in accordance with an embodiment of the present disclosure. In the exemplary embodiment shown in FIG. 7, a population size of 20 and generation number of 3 are selected. Unlike converged inversion with LM and BR, GA inversion using such a parameter combination is not meant to converge, but to achieve acceptable results with limited cost. FIG. 7 shows variations of five runs of GA inversion, and the resulting parameters are compared with noisy target measurements shown with the dots. In the example of FIG. 7, the parameter search range is from 14000 to 16000 psi for pressure, 0.005 to 0.5 mD/cp for mobility and 1.0 to 10 for skin factor. The inversions with multiple runs can be significantly improved if, for instance, the pressure searching range is reduced from 14900 to 15100 psi as shown in FIG. 8. Because pressure measurement can be observed directly and the uncertainty of initial pressure estimate could be well defined after field test for conventional reservoirs, it is possible to run a faster genetic routine to determine other reservoir parameters.

In certain embodiments, computer-readable instructions setting forth the methods disclosed herein may be stored in a computer readable medium accessible to an information handling system. The information handling system may then utilize the instructions provided to perform the methods disclosed herein in an automated fashion. In one embodiment, the information handling system may provide a user interface allowing manipulation and monitoring of the data obtained. The data may then be used to optimize one or more aspects of performance of subterranean operations. Specifically, a formation tester tool may be directed downhole to a desired location within the formation. The information handling system may be communicatively coupled to the formation tester tool and may receive the data collected by the formation tester tool. The information handling system may then perform a regression using one or more of the deterministic, probabilistic and evolutionary methods disclosed herein to determine specific reservoir parameters from the wellbore transient data.

The methods disclosed herein provide several advantages. In certain embodiments, one or more of the deterministic, probabilistic and/or evolutionary methods disclosed herein may be used as an integrated solution permitting comparison and/or optimization of analysis of subterranean characteristics. Additionally, the methods disclosed herein permit application of inversion to user selected data intervals. Moreover, the methods disclosed herein are applicable to both conventional reservoirs and very low permeability reservoirs by using only measurement data obtained during a predetermined time period (e.g., first 30 minutes). Finally, the methods disclosed herein may be used with an offset probe for anisotropy analysis through multi-curve regression. Specifically, in certain embodiments, two or more probes may be used to implement the methods disclosed herein. For instance, in certain embodiments, the formation tester may have two probes. A first set of data may be obtained using the first probe of the formation tester and a second set of data may be obtained using the second probe of the formation tester. The same procedure discussed herein is then applied to the data obtained from each individual probe, respectively. Once an estimate of the reservoir parameters is obtained at each probe, the estimated reservoir parameters may be reported separately for each probe, or may be combined to calculated additional reservoir parameters such as anisotropy and skin factor using the basic equation described in U.S. Pat. No. 7,059,179 B2.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of determining a parameter of a formation of interest at a desired location, comprising:
   conveying a formation tester tool to the desired location in the formation of interest;
   obtaining data from the desired location in the formation of interest, wherein the obtained data relates to a first parameter at the desired location of the formation of interest;
   calculating at least one parameter of a curve based on the first parameter;
   inverting the obtained data, wherein inverting the obtained data comprises using a method selected from a group consisting of a deterministic approach, a probabilistic approach, and an evolutionary approach;
   optimizing a curve of the obtained data and a simulated first parameter to an estimate in part by at least one of deterministic, probabilistic, and evolutionary approaches; and
   optimizing one or more aspects of performance of one or more operations of the formation tester tool within a pre-determined time based, at least in part, on one or more parameters of the optimized curve.

2. The method of claim 1, wherein further comprising directing the formation tester tool to another desired location based, at least in part, on the one or more parameters of the optimized curve.

3. The method of claim 1, wherein the first parameter is a transient pressure during a formation test at the desired location in the formation of interest, wherein a second parameter is selected from a group consisting of actual reservoir pressure, fluid mobility, skin factor, formation porosity and fluid compressibility.

4. The method of claim 1, wherein inverting the obtained data comprises using a deterministic approach and wherein the deterministic approach comprises using a Levenberg Marquardt algorithm, and further comprising applying a Gauss-Newton approximation of a Hessian matrix to the first parameter at the desired location to determine a second parameter at the desired location of the formation of interest.

5. The method of claim 4, wherein inverting the obtained data comprises using a probabilistic approach and wherein the probabilistic approach comprises using a Bayesian learning algorithm.

6. The method of claim 1, wherein inverting the obtained data comprises using an evolutionary approach and wherein the evolutionary approach comprises using one or more genetic parameters selected from a group consisting of selection, mutation, and crossover to determine a second parameter at the desired location of the formation of interest.

7. The method of claim 1, wherein the formation tester tool comprises a first probe and a second probe, wherein obtaining data from the desired location in the formation of interest comprises obtaining a first set of data using the first probe and obtaining a second set of data using the second probe.

8. The method of claim 1, wherein inverting the obtained data comprises using a deterministic approach and wherein the deterministic approach comprises using a Levenberg-Marquardt algorithm.

9. An information handling system having a non-transitory computer readable medium, wherein the non-transitory computer readable medium contains instructions to:
   obtain data from a formation tester tool at a desired location in the formation of interest, wherein the obtained data relates to a first parameter at the desired location of the formation of interest;
   calculate at least one parameter of a curve based on the obtained data and simulated first parameter;
   invert the obtained data, wherein inverting the obtained data comprises using a method selected from the group consisting of a deterministic approach, a probabilistic approach, and an evolutionary approach;
   optimize a curve of the obtained data and the simulated first parameter to determine an estimate by at least one of a deterministic approach, a probabilistic approach, and an evolutionary approach, and
   optimize one or more aspects of performance of one or more operations of the formation tester tool within a pre-determined time based, at least in part, on one or more parameters of the optimized curve.

10. The information handling system of claim 9, wherein the first parameter is a transient pressure during a formation test at the desired location in the formation of interest.

11. The information handling system of claim 9, wherein inverting the obtained data comprises using a deterministic approach and wherein the deterministic approach comprises using a Levenberg-Marquardt algorithm, and further comprising applying a Gauss-Newton approximation of a Hessian matrix to the first parameter at the desired location to determine a second parameter at the desired location of the formation of interest.

12. The information handling system of claim 9, wherein inverting the obtained data comprises using a probabilistic approach and wherein the probabilistic approach comprises using a Bayesian learning algorithm.

13. The information handling system of claim 12, wherein inverting the obtained data comprises using an evolutionary approach and wherein the evolutionary approach comprises using one or more genetic parameters selected from a group consisting of selection, mutation, and crossover to determine a second parameter at the desired location of the formation of interest.

14. The information handling system of claim 9, wherein inverting the obtained data comprises using a deterministic approach and wherein the deterministic approach comprises using a Levenberg-Marquardt algorithm.

15. The information handling system of claim 9, wherein the formation tester tool comprises a first probe and a second probe.

16. The information handling system of claim 15, wherein obtaining data from the desired location in the formation of interest comprises obtaining a first set of data using the first probe and obtaining a second set of data using the second probe.

17. A method of estimating a desired parameter of a formation of interest comprising:
   conveying a formation tester tool to a desired location of the formation of interest;
   measuring a first parameter of the formation of interest by a formation tester tool;
   using a relationship between the first parameter of the formation of interest and the desired parameter of the formation of interest to obtain a simulated first parameter;
   calculating at least one parameter of a curve based on the first parameter and the simulated first parameter;
   optimizing a curve of the first parameter of the formation of interest and the simulated first parameter to determine an estimate through deterministic, probabilistic, or evolutionary approaches; and
   optimizing one or more aspects of performance of one or more operations of the formation tester tool within a pre-determined time based, at least in part, on one or more parameters of the optimized curve.

18. The non-transitory computer-readable medium of claim 17, further comprising obtaining data from the formation tester tool, inverting the obtained data, wherein inverting the obtained data comprises using a deterministic approach and wherein the deterministic approach comprises using a Levenberg-Marquardt algorithm.

19. The non-transitory computer-readable medium of claim 18, wherein the Levenberg-Marquardt algorithm comprises using at least one of a Jacobian matrix and an approximate Jacobian.

20. The non-transitory computer-readable medium of claim 18, further comprising applying a Gauss-Newton approximation of a Hessian matrix to the first parameter at the desired location to determine the desired parameter at the desired location of the formation of interest.

* * * * *